United States Patent [19]

Jacob

[11] Patent Number: 5,701,336
[45] Date of Patent: Dec. 23, 1997

[54] ROTARY-ANODE X-RAY TUBE

[75] Inventor: Heinz-Jürgen Jacob, Norderstedt, Germany

[73] Assignee: U.S. Philips Corporation, New York, N.Y.

[21] Appl. No.: 771,877

[22] Filed: Dec. 23, 1996

Related U.S. Application Data

[63] Continuation of Ser. No. 461,458, Jun. 5, 1995, abandoned.

[30] Foreign Application Priority Data

Jun. 4, 1994 [DE] Germany ............... 44 19 696.0

[51] Int. Cl.⁶ .................................................. H01J 35/26
[52] U.S. Cl. ........................... 378/132; 378/133; 378/125
[58] Field of Search ........................... 378/119, 121, 378/125, 132, 144, 130, 133

[56] References Cited

U.S. PATENT DOCUMENTS 5,210,781  5/1993  Ono et al. .................. 378/132
5,224,142  6/1993  Ono et al. .................. 378/132
5,381,456  1/1995  Vetter et al. ................ 378/132

FOREIGN PATENT DOCUMENTS 0578314  1/1994  European Pat. Off. .

*Primary Examiner*—Don Wong
*Attorney, Agent, or Firm*—Jack D. Slobod

[57] ABSTRACT

The invention relates to a rotary-anode X-ray tube comprising a plain bearing, notably a spiral groove bearing, which comprises a bearing shaft and a bearing shell which encloses the bearing shaft, contains essentially molybdenum and/or tungsten or alloys thereof, and consists of at least two bearing shell portions, a liquid lubricant being present between the bearing shaft and the bearing shell. The material consumption and the manufacturing effort for the bearing shell are reduced in that on the outer side of the bearing portions there are provided connection elements which consist of a weldable material, and that the connection elements are connected to one another by way of a welded joint.

13 Claims, 2 Drawing Sheets

ROTARY-ANODE X-RAY TUBE

This is a continuation division of application Ser. No. 08/461,458, filed Jun. 5, 1995, now abandonment.

BACKGROUND OF THE INVENTION

The invention relates to a rotary-anode X-ray tube, comprising a sleeve bearing, notably a spiral groove bearing, which comprises a bearing shaft and a bearing shell which encloses the bearing shaft, contains essentially molybdenum and/or tungsten or alloys thereof, and consists of at least two bearing shell portions, a liquid lubricant being present between the bearing shaft and the bearing shell.

An X-ray tube of this kind is known from EP-OS 578 314 which corresponds to U.S. Pat. No. 5,381,956. The bearing shell and the bearing shaft consist of a molybdenum alloy (TZM) which on the one hand can be wetted by the gallium alloy used as the liquid lubricant, and which on the other hand is not attacked by this lubricant, not even at temperatures of 300° C. and higher. The bearing shell consists of at least two bearing portions connected to one another.

In practice the bearing portions are connected to one another by means of a number of screws extending parallel to the symmetry axis. This screwed connection must be very strong so as to prevent the lubricant from escaping from the bearing via the gap between the bearing portions. This necessitates large wall thicknesses of the bearing shell.

SUMMARY OF THE INVENTION

It is an object of the present invention to design a rotary-anode X-ray tube of the kind set forth in such a manner that it can be comparatively simply manufactured. This object is achieved in accordance with the invention in that on the outer side of the bearing shell portions there are provided connection elements which are made of a weldable material, and that the connection elements are connected to one another by way of a welded joint. Two bearing portions are thus joined by welding together the connection elements connected to the bearing portions. The fact that direct connection of the two bearing portions of molybdenum (or tungsten) by welding or soldering is not possible, not without heating the bearing shell to a temperature at which the lubricant contained therein (usually a gallium alloy) reacts with the molybdenum, is thus taken into account. The statement that the connection elements consist of a weldable material thus means that parts consisting of this material must be connectable by welding, during which the temperature of the lubricant, however, may not become so high that the lubricant react with the bearing material.

This indirect joining of the bearing shell portions reliably precludes the escape of lubricant through the welded joint between the connection elements. Therefore, unlike the case of screwed connection, the bearing shell portions need not be pressed onto one another in such a manner that the lubricant cannot escape via the gap existing therebetween. Therefore, at the area of connection their wall thickness may be substantially smaller (for example, 2 mm) than in a sleeve bearing with a screwed connection (approximately from 10 to 15 mm). The sleeve bearing in accordance with the invention thus requires less molybdenum than a sleeve bearing with a screwed connection, resulting in a reduction of the volume and the weight of the sleeve bearing. A further essential cost advantage consists in the fact that the (threaded) bores in the molybdenum or tungsten bearing shell portions can be dispensed with. Such bores can be formed only with great expenditure.

Even when only a small gap remains between the facing end faces of the bearing portions in a rotary-anode X-ray tube in accordance with the invention, via this gap, lubricant could still reach the connection elements or the welded joint and react therewith. In order to preclude this with certainty, in a further embodiment the facing end faces of at least a part of the bearing portions are provided with a coating which cannot be wetted by the lubricant.

In a further embodiment of the invention, one of the connection elements consists of an alloy containing iron, nickel and cobalt. In the temperature range of relevance to a plain bearing, such an alloy has substantially the same thermal expansion coefficient as molybdenum. In another embodiment, the connection elements are soldered to the bearing portions. This is because the iron-nickel-cobalt alloy can be readily soldered to molybdenum. The bearing portion could then reach a temperature beyond the permissible operating temperature of the plain bearing, but this is not objectionable because the connection elements can be soldered on before introduction of the lubricant into the bearing shell.

In a preferred embodiment of the invention, the connection elements and the bearing portions have common end faces. It would also be possible to form the end faces of the bearing portions on the one hand and of the connection elements on the other hand in different planes, but a common end face is simpler to realise because after joining, for example by soldering, the connection element and the associated bearing portion need then merely be ground so as to be flat.

BRIEF DESCRIPTION OF THE DRAWING

The invention will be described in detail hereinafter with reference to the drawings. Therein.

DETAILED DESCRIPTION OF THE PREFERRED EMBODIMENTS

Figure 1:
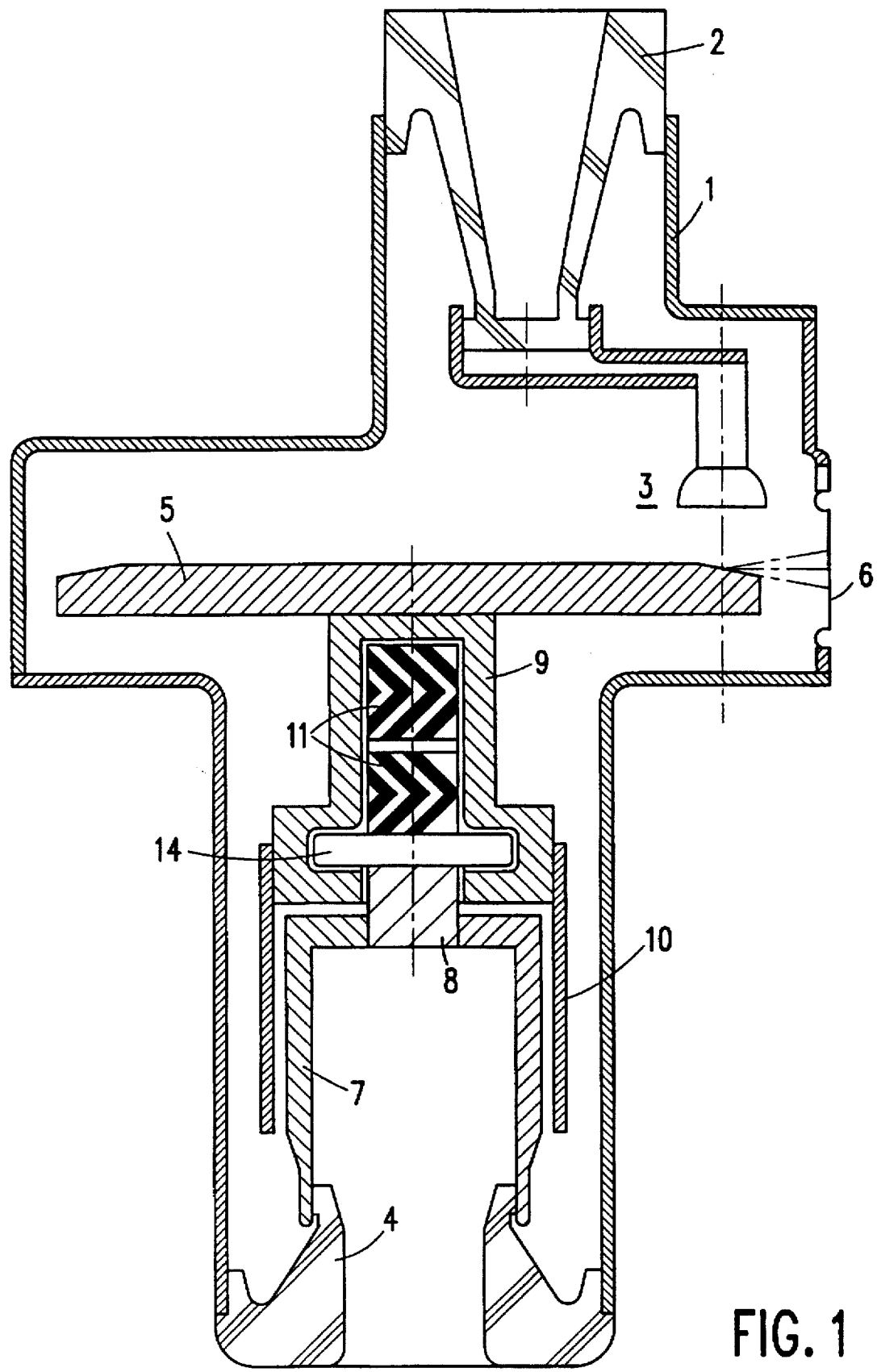
FIG. 1 shows an X-ray tube comprising a plain bearing in accordance with the invention.

The rotary-anode X-ray tube shown in FIG. 1 comprises a metal envelope 1 whereto the cathode 3 is secured by way of a first insulator 2 and whereto the rotary-anode is secured by way of a second insulator 4. The rotary anode comprises an anode disc 5 whose surface which faces the cathode generates X-rays upon application of a high voltage. The X-rays can emanate v/a a radiation exit window 6 which is provided in the envelope and preferably consists of beryllium. V/a a bearing arrangement, the anode disc 5 is connected to a supporting member 7 which is secured to the second insulator 4. The bearing arrangement comprises a bearing shaft 8 which is rigidly connected to the supporting member 7 and a bearing shell 9 which concentrically encloses the bearing shaft 8 and which is provided at its lower end with a rotor 10 for driving the anode disc secured to its upper end. The bearing shaft 8 and the bearing shell 9 consist of a molybdenum alloy (TZM). However, molybdenum, tungsten or a tungsten alloy can be used instead.

At its upper end the bearing shaft 8 is provided with two fishbone groove patterns 11 which are offset relative to one another in the axial direction and which serve to take up radial forces. The cylindrical gap between the groove patterns 11 and the bearing shell 9 is fried with a liquid lubricant which is preferably a gallium alloy. The width of the gap corresponds, for example to the depth of the grooves and may amount to from 10 μm to 30 μm in practice. When the rotary anode rotates in the prescribed direction of rotation, the lubricant is transported to the area of the groove pattern where the grooves pair-wise come together. At this area a pressure is built up in the lubricant in order to take up the forces radially acting on the bearing.

Adjacent the area provided with groove patterns 11 for radial journalling, the shaft 8 comprises a section 14 having a thickness of several millimeters and a diameter which is substantially larger than the diameter of the remainder of the bearing shaft 8. This section is followed in the downward direction by a section whose diameter corresponds at least approximately to the diameter of the part of the bearing shaft 8 which is connected to the supporting member 7. The inner contour of the bearing shell 9 matches to the outer contour of the bearing shaft. The free end faces at the upper and the lower side of the section 14, or the facing surfaces in the bearing shell 9, are provided with spiral groove patterns. Bearing forces acting in the axial direction can thus be taken up.

Figure 2A:
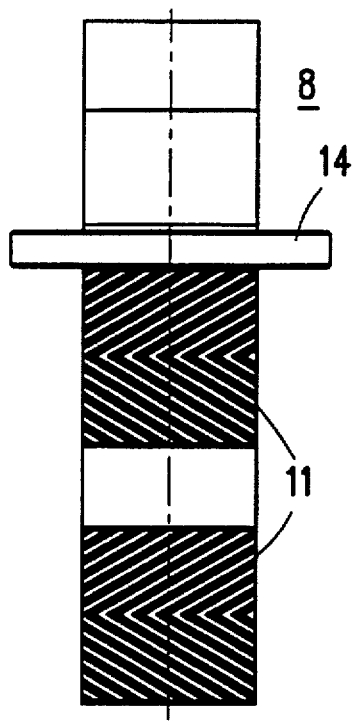
FIG. 2A shows the bearing shaft of such a plain bearing.
Figure 2B:
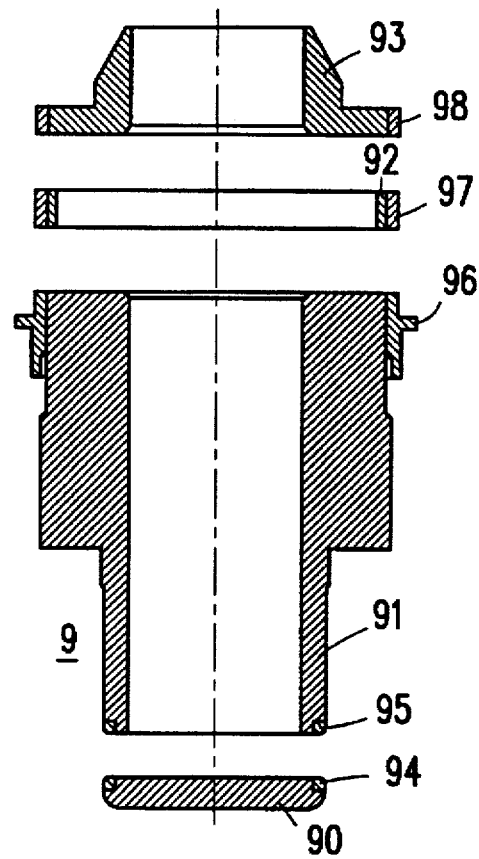
FIG. 2B shows the individual bearing portions of the bearing shell of such a sleeve bearing.

FIG. 1 shows a one-piece bearing shell 9. However, to those skilled in the art it will be evident that the bearing shell 9 must be assembled from several portions. This becomes apparent from FIG. 2A which shows the bearing shaft 8 and FIG. 2B which shows the bearing portions of the bearing shell 9, be it in the reverse position in comparison with FIG. 1. The bearing shell 9 comprises a lid 90 which serves to close a cylinder 91 which takes up the part of the bearing shaft 8 provided with the spiral groove patterns 11. The bearing shell portions of the bearing shell 9 also include a bearing ring 92 whose axial and radial dimensions are slightly larger than the corresponding dimensions of the section 14 of the bearing shaft 8. Finally, the bearing shell also comprises a bearing portion 93 which encloses the part of the bearing shaft 8 which is remote from the groove patterns 11.

The sleeve bearing is assembled as follows. First the bearing shell portions 90 . . . 93 are provided with annular connection elements 94 . . . 98. These connection elements are made of a material which can be suitably welded and mechanically worked, for example an iron-nickel-cobalt alloy (alloys of this kind are marketed as Vacon or Kovar) and which also offers the advantage that in the range of operating temperature of the bearing it has approximately the same thermal expansion coefficient as molybdenum or TZM, being the material of the bearing portions 90 . . . 93. The connection elements 94 . . . 98 are either let into the bearing portions 90 . . . 93, such as the connection elements 94, 95 into the lid 90 or into the facing end of the bearing portion 91, or they enclose the associated bearing portion, like the rings 96, 97 or 98 which enclose the upper end of the bearing portion 91, the ring 92 or the bearing portion 93.

The connection elements 94 . . . 98 are connected to the associated bearing shell portion 90 . . . 93 by hard soldering. Subsequently, the end faces of all portions are ground so as to be flat always in planes perpendicular to the bearing shaft, so that the end face of a bearing portion (for example, 90) and of the associated connection element (94) are situated in a common plane. Subsequently, the lower end face of the bearing shell portion 91 and the two end faces of the annular bearing shell portion and connection element 92/97 are provided with a coating which cannot be wetted by the lubricant.

When a gallium alloy is used as the lubricant, this coating can be realized, for example by means of a titanium-acetylacetonate (TiAcAc) alcohol solution. After deposition of this solution and subsequent thermal treatment, a coating of inter alia titanium dioxide which precludes wetting is formed on the end faces. This prevents the lubricant from reaching the connection elements 94 . . . 98 via the gap formed by the end faces, so that it cannot react with these elements. Such a coating could in principle also be provided on the end faces of the bearing shell portions 90 and 93 as well as on the upper end face of the bearing shell portion 91. However, this coating must leave the groove pattern intended for axial journalling exposed, as otherwise its function will be degraded. Subsequently, the bearing portions 90, 91 are pressed together and joined along their entire outer circumference by welding. Such welding heats the two portions only slightly; the high temperatures required for welding occur only at the edges of the end faces.

Subsequently, the bearing shell portion 92 is joined with the upper end of the bearing shell portion 91 in that the ring 97 is welded to the ring 96 in a similar manner.

The assembly of the bearing shell portions 90, 91, 92 results in a vessel which is open at the top and in which the lubricant is introduced after it has been ensured, by way of a suitable treatment, that the inner surfaces of this vessel can be wetted by the lubricant. After the bearing shaft 8 has been treated in a similar manner, it is lowered into the vessel, the major part of the lubricant present therein then being forced out. Finally, the bearing shell portion 93 is connected to the bearing shell portion 92 in that the annular connection elements 97 and 98 are joined by welding.

Figure 3:
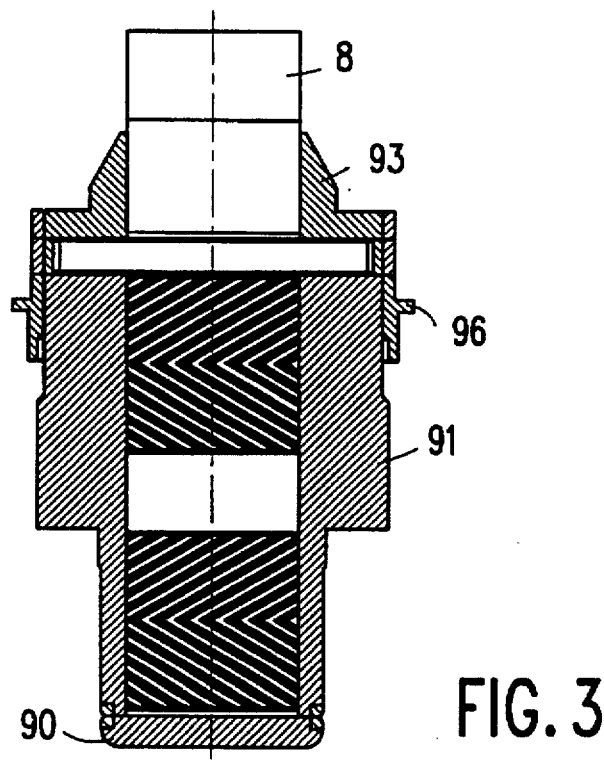
FIG. 3 shows the sleeve bearing in the assembled condition.

The spiral groove bearing shown in FIG. 3 is thus obtained. In comparison with the bearings used thus far in practice, it excels notably by its smaller outer diameter, notably at the area of the section 14, so that the weight as well as the material consumption are reduced. Screwed connections are no longer required between the bearing shell portions to be connected to one another, so that working is substantially simplified. Because of the lower material consumption and the reduced production effort, the manufacture of the bearing is substantially less expensive. After connection of the anode disc 5 to the bearing shell 9 and welding of the rotor 10 (see FIG. 1) to the connection element 96, the free end of the bearing shaft 8 is connected to the supporting member 7, after which the anode construction thus formed is built into the X-ray tube.

The invention has been described on the basis of a plain bearing in which the bearing shaft 8 has a T-shaped cross-section because of the section 14. However, the invention can also be used in conjunction with bearing shafts of other shape, for example purely cylindrical shafts, and matching bearing shells. Moreover, an embodiment has been considered in which the bearing shaft is stationary and the bearing shell rotates. However, the invention can also be used in sleeve bearings in which the bearing shell is stationary and the shaft rotates.

I claim:

1. A rotary-anode X-ray tube, comprising a rotary anode, a sleeve bearing which comprises a stationary bearing shaft and a rotary bearing shell which encloses the bearing shaft and is rigidly connected to the rotary anode, and a liquid lubricant which is present between the bearing shaft and the bearing shell, said bearing shell being assembled from at least two axially aligned bearing shell portions which consist of essentially molybdenum and/or tungsten or alloys thereof and at least two connection elements which are made of a weldable material, wherein each of the connection elements is rigidly carried by an outer side of a different one of the bearing shell portions and is connected to another of the connection elements by way of a welded joint.

2. A rotary-anode X-ray tube as claimed in claim 1, wherein the bearing shell portions consist of molybdenum or a molybdenum alloy, and the connection elements consist of an alloy containing iron, nickel and cobalt.

3. A rotary-anode X-ray tube as claimed in claim 1, wherein the facing end faces of at least a part of the bearing shell portions are provided with a coating which cannot be wetted by the lubricant.

4. A rotary-anode X-ray tube as claimed in claim 1, wherein the connection elements are soldered to the bearing portions.

5. A rotary-anode X-ray tube as claimed in claim 1, wherein the connection elements are connected to one another by laser welding.

6. A rotary-anode X-ray tube as claimed in claim 1, wherein the connection elements have an annular inner cross-section and that parts of the bearing shell portions connected thereto have a matching outer cross-section.

7. A rotary-anode X-ray tube as claimed in claim 1, wherein the connection elements and the bearing shell portions have common end faces.

8. A rotary-anode X-ray tube, comprising a sleeve bearing which comprises a bearing shaft and a bearing shell which encloses the bearing shaft, and a liquid lubricant which is present between the bearing shaft and the bearing shell, said bearing shell being assembled from at least two bearing shell portions which consist of essentially molybdenum or an alloy thereof, wherein on an outer side of the bearing shell portions there are provided connection elements which consist of an alloy containing iron, nickel and cobalt, which connection elements are connected to one another by way of a welded joint.

9. A rotary-anode X-ray tube as claimed in claim 8, wherein the facing end faces of at least a part of the bearing shell portions are provided with a coating which cannot be wetted by the lubricant.

10. A rotary-anode X-ray tube as claimed in claim 8, wherein the connection elements are soldered to the bearing portions.

11. A rotary-anode X-ray tube as claimed in claim 8, wherein the connection elements are connected to one another by laser welding.

12. A rotary-anode X-ray tube as claimed in claim 8, wherein the connection elements have an annular inner cross-section and that parts of the bearing shell portions connected thereto have a matching outer cross-section.

13. A rotary-anode X-ray tube as claimed in claim 8, wherein the connection elements and the bearing shell portions have common end faces.

* * * * *